United States Patent [19]

Cartossi

[11] 4,350,259

[45] Sep. 21, 1982

[54] STAINLESS STEEL CONTAINER WITH THERMORADIATING BOTTOM

[75] Inventor: Ferdinando Cartossi, Novara, Italy

[73] Assignee: AMC International Alfa Metalcraft Corporation S.A., Rotkreuz, Switzerland

[21] Appl. No.: 192,239

[22] Filed: Sep. 30, 1980

Related U.S. Application Data

[63] Continuation of Ser. No. 5,723, Jan. 23, 1979, abandoned.

[30] Foreign Application Priority Data

Jan. 26, 1978 [IT] Italy ............................ 19689
Mar. 7, 1978 [IT] Italy ............................ 20974

[51] Int. Cl.$^3$ .............................................. B02D 20/14
[52] U.S. Cl. ...................................... 220/66; 220/68; 126/390
[58] Field of Search .................... 220/66, 68; 126/390

[56] References Cited

U.S. PATENT DOCUMENTS

| | | | |
|---|---|---|---|
| 1,730,034 | 10/1929 | Faulk | 220/68 |
| 2,471,663 | 5/1949 | Tietz | 126/390 X |
| 2,841,137 | 7/1958 | Chace | 126/390 |
| 3,045,664 | 7/1962 | Levin | 220/68 X |
| 3,788,513 | 1/1974 | Racz | 126/390 X |

*Primary Examiner*—Steven M. Pollard
*Attorney, Agent, or Firm*—Hill, Van Santen, Steadman, Chiara & Simpson

[57] ABSTRACT

A container is equipped at the bottom thereof with an aluminum layer of considerable thickness, as compared with the thickness of the said bottom, the said layer incorporating a plate of rolled steel, thoroughly anchored in the said layer, in such a way that at least part of the surface thereof projects from the face of the said aluminum layer. To ensure the anchorage of the rolled steel plate, the latter is provided with openings through which the aluminum penetrates and wherein it anchors.

2 Claims, 7 Drawing Figures

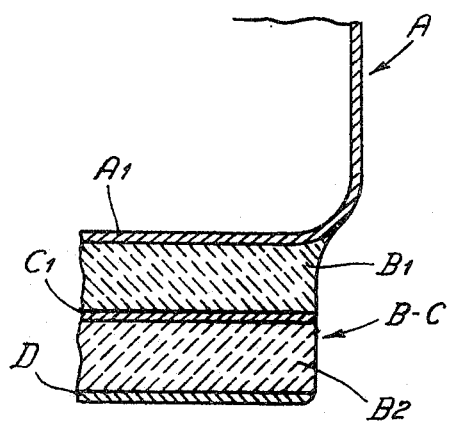
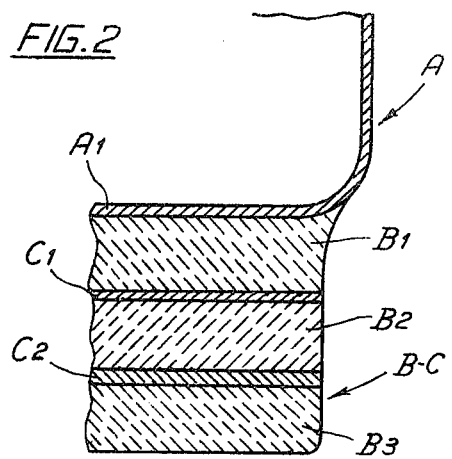
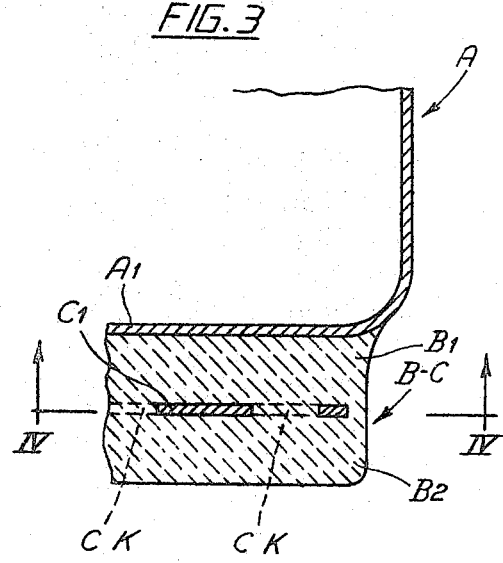
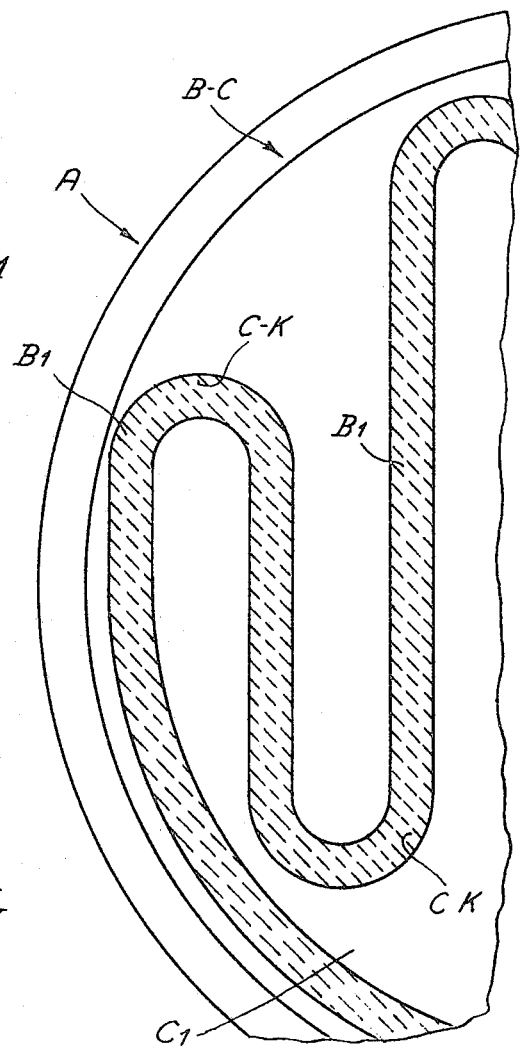

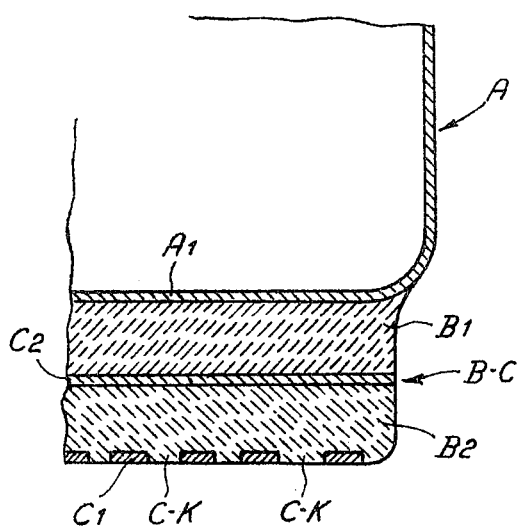
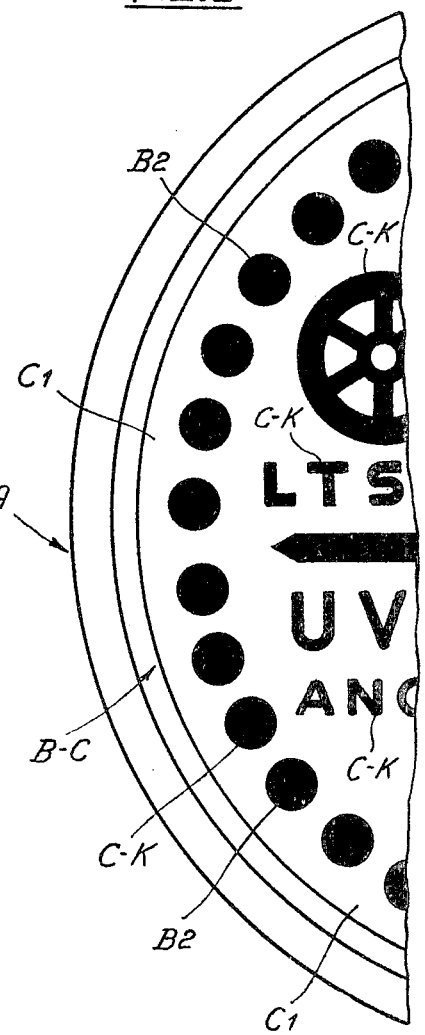
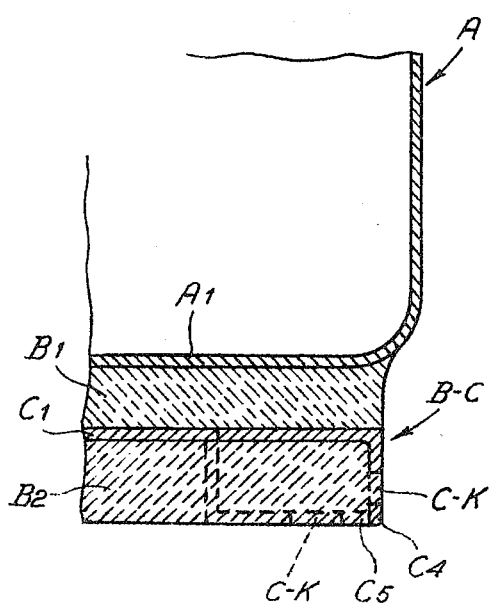

STAINLESS STEEL CONTAINER WITH THERMORADIATING BOTTOM

RELATED APPLICATION

This is a continuation of application Ser. No. 5,723 filed Jan. 23, 1979, abandoned with the filing of this application.

FIELD OF THE INVENTION

The present invention concerns a stainless steel container with a thermo-radiating bottom made of aluminum and/or of aluminum alloys, the container being heatable by means of different thermic sources.

PRIOR ART

The advantages provided by steel containers are already known in the art, with particular reference to those used for food-cooking purposes. But the said known containers, owing to the properties of stainless steel including a limited thermic coefficient of thermal transmission cause drawbacks during the food cooking operation, since overheated areas, as well as areas having a reduced temperature, form.

Several attempts have been already made to suppress the drawbacks, by providing the container bottom with a layer of advantageous thickness made of heat-diffusing material, for example of copper, aluminum and/or the alloys thereof. Special advantages have been attained by applying aluminium and/or aluminum alloys to the bottom of the stainless steel container, since aluminum is an excellent heat-conveyor.

However the aforementioned drawbacks are suppressed but partly and in particular such drawbacks and others occur, when utilzing different heat sources to heat the container.

In fact it is known that the bottom of the stainless steel container provided with a layer of advantageous thickness of aluminum and/of the alloys thereof, in particular if said bottom is large dimensioned, is always subject to deformation when submitted to a thermic action. Such deformations, due to the heat, can cause the detachment of the heat-conveying layer or, otherwise, the rupture of the metallic continuity between said conveyor layer and the bottom of the container made of stainless steel. The last mentioned condition, even if not rendering the container unutilizable, creates however a precarious situation as concerns the thermic conductivity which, of course, is considerably reduced, while, on the other hand, cracks and flaws can occur with a consequent formation of oxides or places of heat insulating material.

The inconvenience is still greater when conducting thermic elements are used as a thermic source, namely metal plates incorporating the thermic source, for example an electric resistance. In this case, further drawbacks occur, because owing to the deformation of the bottom, the perfect metallic contact between the said bottom and the metal surface of the thermic source on which the said bottom rests, never takes place, causing a dispersion of thermic energy while, at the same time, the thermic transmission is irregular and nonuniform.

Still further drawbacks and problems occur when the user wishes to avail himself of the bottom of the container as a thermic source, generating induced currents within the same. In this case it is, necessary to prevent the deformations to which the container botton tends to be, and subjected and to ensure the maximum planarity, at the same time to permit and to favor the formation of induced currents in the bottom comprising non-magnetizable materials, such as stainless steel and aluminum.

SUMMARY OF THE INVENTION

The purpose of the present invention is not only that of suppressing the drawbacks and solving the above mentioned problems and still others, but also to provide stainless steel containers with a thermoradiating bottom of aluminum or of the alloys thereof, even if the bottom concerned is large dimensioned, the containers to be heated with a maximum of thermic transmission from the different thermic sources the end-user desired to utilize, such as, for example, gas-flames, thermo-conveying plates with an incorporated or free electric resistance, plates and/or induction ovens, etc.

Another purpose of the invention is to provide containers of the above mentioned type, having a bottom made of thermo-radiating aluminum or aluminum alloys, without subjecting the bottom to deformation, which can be prejudicial to its thermic transmission.

Still another purpose of the present invention is to guarantee the co-planarity of the container bottom with the hot plate or other thermic source generator.

Still another purpose of the invention is to ensure a stable and metallically continuous coupling between the bottom of the container and the thermically conducting layer.

Still another purpose of the invention is to provide a container of the above mentioned type which can be heated by means of electric induction and where the electric currents are generated in the metallic layers which constitute the bottom of the container itself.

A stainless steel container according to the invention is provided with a thermoradiating bottom of aluminum and/or of aluminum alloys, the bottom comprising at least one layer of aluminum and/or of the alloys thereof, which incorporates one rolled steel or iron plate firmly anchored to the said layer of aluminium or of aluminum alloys.

Preferably the steel or iron plate has shaped openings, and at least part of its upper surface projects reproduce in this way the outline of the shaped openings.

To meet the end-user's particular requirements, it is of course possible to provide the bottom of the container with at least two superimposed aluminum layers and with an inserted rolled plate and the said bottom can be equipped with a protective coating of stainless steel to be applied, in firm union, at the same time as the application, to the bottom of the container, of the layers of heat-conducting materials.

Advantageously the rolled plate wich is interposed between the two aluminum layers and/or aluminum alloys, comprises, at least partly, magnetic or magnetizable material, for also heating the container by means of induced currents. For this purpose at least part of the metallic layers forming the bottom of the container, can be for example zigzag or spiral shaped, closed in the form of rings, etc., for the circulation of the induced currents, to heat the said bottom directly.

The invention is explained in the following description, in the form of an representative but not limiting example, with reference to the annexed drawing which illustrates some of the forms of the container according to the invention.

ON THE DRAWINGS

FIG. 1 is a partial cross section of an embodiment of the bottom of a container according to the invention;

FIGS. 2 and 3 are like cross sections through two other variations;

FIG. 4 is a partial cross-section taken along line IV—IV of FIG. 3;

FIG. 5 is another cross section through an other variation,

FIG. 6 is a fragmentary partial bottom view of the container shown in FIG. 5.

FIG. 7 which is similar to FIG. 4, shows another form of realization of according to the invention.

AS SHOWN ON THE DRAWINGS

In the above mentioned view, the corresponding parts are identified by the same reference characters, container of stainless steel A has a bottom wall A1 which retains, in a firm union, a thermo-radiating bottom B-C, which comprises two layers B1 and B2 made of a heat conveying material, such as aluminum and/or aluminum alloys.

According to the present invention, a layer C1 of iron or steel foil, also referred to herein as rolled plate, is interposed between the two layers of aluminum B1 and B2, the layers B1, B2 being firmly retained by and anchored in the said aluminum layers.

In the embodiment of FIG. 1, the free or lower face of layer B2, has a coating or jacket D of a protective material, such as stainless steel, such protective jacket being retained firmly by and against the lower layer B2.

The fabrication of the thermo-radiating bottom B-C, is effected by superimposiing, on the bottom A1 of the container A of stainless steel, the layer B1 of aluminum, the layer of iron foil C1 and the final aluminum layer B2. Thereafter, the superimposed elements are heated up to an appropriate temperature, near the melting point or aluminum, and thereafter a high pressure is applied to the pile of superimposed elements, by means of which and in cooperation with the said temperature, continuous stable and indissoluable connections are obtained both between the above mentioned layers, as well as with the bottom A1 of the container.

To facilitate the transport thereof during the heating and the application of the pressure, The elements may be secured to each other by means of a prior soldering process, thus ensuring the desired position of the said layers with respect to each other and to the bottom.

The thickness of the various metal layers of the illustrated bottom BC may be as follows: the layers of aluminum and/or the alloys thereof may vary from 3 to 20 mm, while the iron layer C1 may have a thickness from 0.20 to 3 mm. The thickness of the stainless steel container A varies from 0.5 to 2.5 mm.

For the purpose of assuring a close and continuous adhesion of the heterogeneous layers of aluminum and iron to each other, the layer C of iron or of steel can be provided with a suitable coating, for example a coating of zinc or aluminum.

In the modification shown in FIG. 2, the thermo-radiating bottom B-C here comprises several layers B1, B2, B3 of aluminum and of the alloys thereof, between which intermediate layers C1 and C2 of iron or of steel are inserted.

In this modification the intermediate layers of iron C1 and C2 are different in thickness, that is the layer C1 has a small thickness than the layer C2: to enable the electric heating of the container by means of induced currents.

The thermo-radiating bottom B-C of the modification illustration in FIG. 3 is substantially the same as that of FIG. 1; but in this case the rolled iron plate C1 inserted between the two aluminum layers B1 and B2 is provided with advantageously arranged and shaped openings or slots CK. The openings concerned can be arranged along a suitable line similar to that shown in FIG. 4, where the openings CK follow an undulated or a zigzag line. In practice, the openings CK can be arranged so as to follow any desired line and they can be disposed and shaped in any desired manner; in the simplest case, the said openings can be holes having an appropriate diameter, so that during the application of the pressure to the thermo-radiating bottom B-C, the aluminum of at least one of the two layers B1, B3 in the neighborhood of the rolled plate $C_1$ can metallically penetrate into and metallically connect, in a direct and mutual manner, with the aluminum of the opposite layer, to ensure the direct and homogeneous metallic continuity of the said aluminum layers.

In the case of the thermo-radiating bottoms B-C, shown in FIGS. 1 and 2, the iron layers C1-C2, are so dimensioned that their edges project and are flush with the edges of the aluminum layers B1-B2, etc.

For the thermo-radiating bottom a peripheral edge is provided having two or more bands subdivided by peripheral lines defined by the layers C1, C2, etc. In the embodiment of FIG. 3, the periphery of the thermo-radiating bottom B-C has only one continuous and homogeneous band, as the contour of the rolled iron plate C1 is less than that of the aluminum layers B1, B2 etc.

With reference to FIGS. 5 and 6, the rolled plate C2 is incorporated in the aluminum layer B2, so as to be at the surface of said aluminum layer; the rolled plate C2 has openings CK which are advantageously distributed and through which the material of the layer B2 penetrates to anchor the plate C2 for the purpose of ensuring that the bottom B-C is monolithic. The holes or apertures CK can be pierced in the rolled plate C2 so as to lie in a desired pattern, such as shown, for example, in FIG. 6, to obtain contrasting effects in relation to the physical characteristics of the two metals forming the thermo-radiating bottom of the pan. It is possible to utilize Said feature to reproduce a design or code on the bottom of the container A, which is of use in establishing the provenience and/or the destination of a particular container in relation to the end-use thereof, in particular if the container is to be always used for the same purpose, for instance for industrial operations, or also if it is necessary to differentiate the container from other like containers, made with stainless steel alloys having different characteristics.

In the variant shown in FIG. 7, the bottom B-C of the container A comprises only one rolled plate C1 of iron and/or steel, located between the two layers of aluminum B1 and B2; the edge C4 of the plate C1 projects out of the periphery of the said bottom. The edge C4 is turned down, to form a crown which extends along the periphery of the layer B2, to cover the edge of said layer at least in part. The crown C4 has openings CK, into which the aluminum of the layer B2 penetrates and into which it anchors. In this variant, the crown C4 protects the aluminum layers against blows which could cause projections or juts, which detract from to the evenness of the bottom.

Further modifications and variations can be foreseen in relation to the desired end-uses of the container. For example, in the variant illustrated in FIG. 7, further openings can be provided in the rolled plate C1 in the central area and not only in the crown C4. Furthermore, the downturned edge C4 of the rolled plate C1, instead of forming only the peripheral crown shown in FIG. 7, can be further directed radially inwardly in such a way as to lie parallel to the central area of the rolled plate concerned, as indicated with a dotted line C5: in short, the rolled plate can be bowl-shaped or like a tray and so disposed that the lowermost surface of the rolled plate is co-planar with the bottom of the container. The rolled plates C1, C2, etc., especially if located at the container bottom, can be of stainless steel having characteristics compatabile with a particular thermal source of the induced current type.

Notwithstanding the above described and other variants, the scope of the present invention is not limited by such descriptions.

I claim:

1. Stainless steel container provided with a first integral heat-radiating stainless steel bottom, a second complemental bottom composed of aluminum or alloys thereof having a first tight restrained bond joining it to a bottom side of the heat-radiating stainless steel bottom, and a steel plate or an iron plate having a second bond securing it to a bottom side of said aluminum bottom, said first and second bonds having physical characteristics resultant from preheating of the bottoms and from then subjecting the heated bottoms to high pressure, a rim of the rolled steel plate being at least partly coated and provided with openings, the aluminum of the layer which forms the bottom of the container extending through the openings in anchored assembly.

2. Cookware, comprising:
  (a) a preformed vessel of stainless steel having a bottom;
  (b) two superimposed aluminum discs and an inductively susceptible ferrous disc disposed therebetween, the group of discs having one side disposed against said vessel bottom;
  (c) said inductively susceptible disc having an apertured rim making it cup-shaped and flush with the periphery of the aluminum disc bonded to said bottom, and jacketing the other aluminum disc; and
  (d) each aperture of said rim having aluminum projecting radially therein from the jacketed disc.

* * * * *